United States Patent
Jordan et al.

(10) Patent No.: US 9,085,337 B2
(45) Date of Patent: Jul. 21, 2015

(54) BICYCLE SUSPENSION SYSTEM

(75) Inventors: Brian Jordan, Chicago, IL (US); Kevin Wesling, Lombard, IL (US)

(73) Assignee: SRAM, LLC, Chicago, IL (US)

(*) Notice: Subject to any disclaimer, the term of this patent is extended or adjusted under 35 U.S.C. 154(b) by 1462 days.

(21) Appl. No.: 11/456,499

(22) Filed: Jul. 10, 2006

(65) Prior Publication Data

US 2008/0006496 A1    Jan. 10, 2008

(51) Int. Cl.
*F16F 9/00* (2006.01)
*B62K 21/20* (2006.01)

(52) U.S. Cl.
CPC ............. *B62K 21/20* (2013.01); *B62K 2201/04* (2013.01)

(58) Field of Classification Search
CPC ............................ B62K 21/20; B62K 2201/04
USPC ........................... 267/131, 132; 280/276, 279
See application file for complete search history.

(56) References Cited

U.S. PATENT DOCUMENTS

| | | | |
|---|---|---|---|
| 601,978 A * | 4/1898 | Nevill | 280/283 |
| 602,389 A | 4/1898 | Whitlow | |
| 626,396 A | 6/1899 | Smith | |
| 708,403 A | 9/1902 | Reeves | |
| 4,553,769 A * | 11/1985 | Kawaguchi | 280/276 |
| 5,308,099 A * | 5/1994 | Browning | 280/276 |
| 5,320,374 A * | 6/1994 | Farris et al. | 280/276 |
| 5,855,363 A * | 1/1999 | Svendsen | 267/132 |
| 5,911,428 A * | 6/1999 | Ueda et al. | 280/276 |
| 6,581,919 B2 | 6/2003 | Barefoot et al. | |
| 6,916,033 B2 | 7/2005 | Yih | |
| 2005/0087953 A1* | 4/2005 | Becker et al. | 280/276 |
| 2005/0110237 A1* | 5/2005 | Yih | 280/276 |

* cited by examiner

*Primary Examiner* — Xuan Lan Nguyen
(74) *Attorney, Agent, or Firm* — Milan Milosevic; Lisa Serdynski

(57) ABSTRACT

A suspension system disposed in a bicycle fork. The suspension system includes inner and outer tubes, first and second bushings, a steering mechanism and a shock-absorbing mechanism. The first and second bushings are disposed between the inner and outer tubes to facilitate the sliding of the inner tube within the outer tube. The steering mechanism prevents relative rotation between the inner and outer tubes and is disposed between the first and second bushings. With this configuration, the ratio of the bushing length to the inner tube diameter is greater than 4, resulting in the suspension fork handling most lateral loads without binding.

43 Claims, 5 Drawing Sheets

BICYCLE SUSPENSION SYSTEM

BACKGROUND OF THE INVENTION

The present invention relates to bicycle suspension systems and more particularly to a suspension system disposed in a bicycle fork.

Suspension systems typically used on handlebar-steered vehicles such as bicycles and motorcycles are designed to absorb the impacts and vibrations experienced by riders when the bicycles traverse irregularities on the riding surface. Suspension systems may be positioned in or proximate to the front fork, seat tube, head tube, and other bicycle frame locations. A suspension system in the head or steerer tubes, for example, may include an outer tube and an inner tube slidable within the outer tube, a shock-absorbing mechanism, a steering control mechanism, and two bushings between the inner and outer tubes to facilitate sliding motion between the inner and outer tubes. One drawback of this type of suspension is that the fork may not be able to handle some fore/aft loading when the distance between the two bushings, or the bushing length, is too small. This may lead to binding of the fork. Another drawback of suspension systems in the head or steerer tubes is that the tube length may need to be increased to accommodate the suspension system. However, it is desirable to have a shorter steerer tube. Therefore, there is a need for a suspension system within a head tube or steerer tube that provides a good bushing length packaged within a relatively shorter tube length.

SUMMARY OF THE INVENTION

The present invention provides a bicycle suspension system. The suspension system generally includes inner and outer tubes, first and second bushings, a steering control mechanism and a shock-absorbing mechanism. The first and second bushings are disposed between the inner and outer tubes to facilitate axial sliding motion of the inner tube within the outer tube in response to suspension loading. The first and second bushings do not transmit any appreciable torque between the inner and outer tubes. The steering control mechanism prevents relative rotation between the inner and outer tubes. The shock-absorbing mechanism absorbs the loads applied to the suspension system.

In one embodiment of the present invention, the steering control mechanism is disposed between the first and second bushings. The steering control mechanism includes a noncircular outer surface of the inner tube mating with a complimentary-shaped noncircular inner surface of the outer tube. Preferably, a portion of the inner tube has a double-D shaped outer surface mating with a complimentary-shaped inner surface of the outer tube. More preferably, the outer surface of the inner tube may include two flat sections and two curved sections. A clearance between the inner and outer tubes at the curved sections may be provided to permit relative motion between the inner and outer tubes transverse to an outer tube axis. So configured, the distance between the first and second bushings along the length of the tubes may be large relative to the diameter of the inner tube. The distance between the first and second bushings is referred to as bushing length and is measured from the top of the first or upper bushing to the bottom of the second or lower bushing. In the present invention, the ratio of the bushing length to the inner tube diameter is greater than 4 or preferably approximately 5.8. This allows the fork to handle fore/aft or lateral loading without binding. Further, this configuration minimizes the length of the steerer tube.

In one embodiment of the present invention, the shock-absorbing mechanism includes a positive spring biasing the inner and outer tubes away from each other and a negative spring counteracting the positive spring that biases the inner and outer tubes toward each other. The suspension system may further include a rod connected to the outer tube and extending into the inner tube. The rod may include a head having first and second surfaces. The positive spring is disposed between the first surface of the head of the rod and a first retaining element of the inner tube. The negative spring is disposed between the second surface of the head of the rod and a second retaining element of the inner tube. Preferably, both springs may be entirely disposed in the inner tube to minimize the steerer tube length.

Further, this spring arrangement minimizes the crown-to-axle length Typically, suspension forks have a crown-to-axle length that is greater than those of rigid forks. Ideally, the crown-to-axle length of a suspension fork should only be increased by the amount of suspension travel. Typically, a suspension fork adds 50 mm to the crown-to-axle length while only providing 25 mm of travel. The present invention provides 40 mm of travel while only increasing the crown-to-axle dimension by 40 mm.

These and other features and advantages of the present invention will be more fully understood from the following description of various embodiments of the invention, taken together with the accompanying drawings.

DETAILED DESCRIPTION

Figure 1:
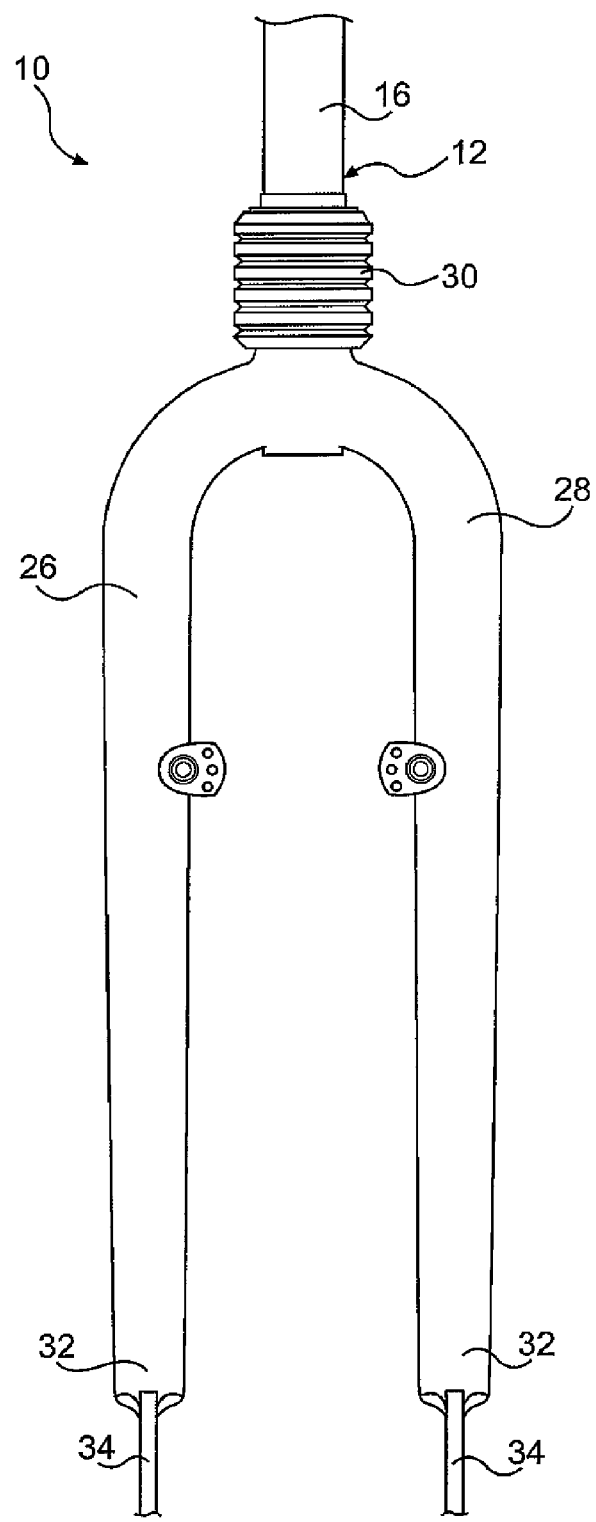
FIG. 1 is a front view of a bicycle suspension fork having a suspension system in the steerer tube in accordance with one embodiment of the present invention.

FIGS. 1-5 illustrate a bicycle front fork 10 with a suspension system 12 associated with a head tube (not shown) of a bicycle frame in accordance with one embodiment of the present invention. The suspension system 12 generally includes inner and outer tubes 14, 16, a shock-absorbing mechanism 18, first and second bushings 20, 22 and a steering control mechanism 24. Looking to FIG. 1, the fork 10 includes first and second legs 26, 28, the outer tube 16 mountable to the head tube and a bellows 30 disposed between the outer tube 16 and the legs 26, 28 to seal and protect the suspension system 12 from foreign matter. An end 36 of the outer tube 16 is connected to the bellows 30 which is connected to the legs 26, 28 of the fork 10 (see FIG. 2). The first and second legs 26, 28 are connected at their remote ends 32 to a wheel axle (not shown) through dropouts 34. The first and second legs 26, 28 and the inner tube 14 move axially or slidingly relative to the outer tube 16 in response to loading of the suspension system 12.

Figure 2:
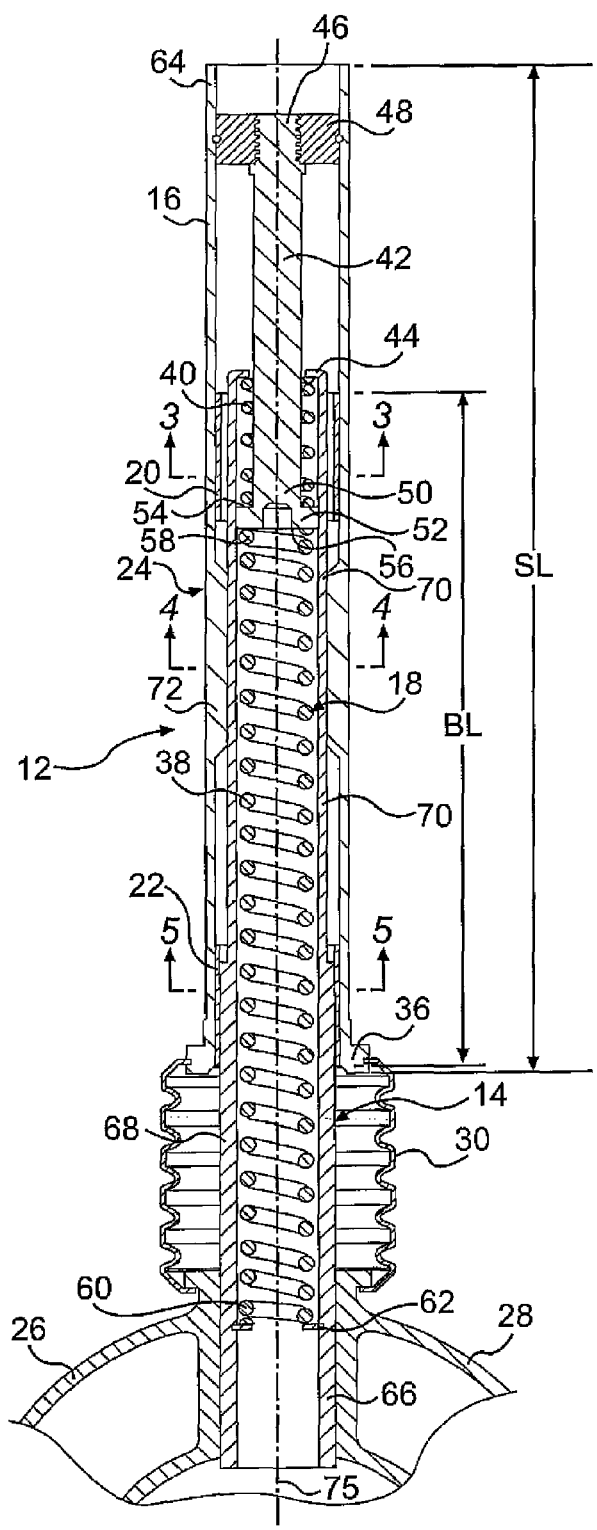
FIG. 2 is a cross-sectional view of the suspension system of FIG. 1.
Figure 3:
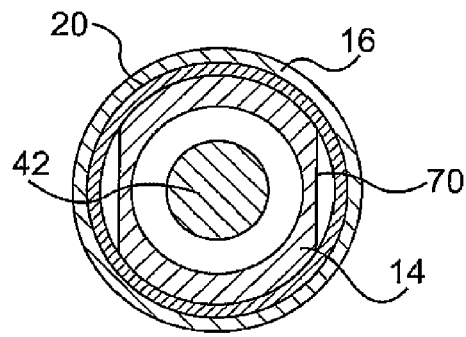
FIG. 3 is a cross-sectional view taken along line 3-3 of the suspension system of FIG. 2.
Figure 4:
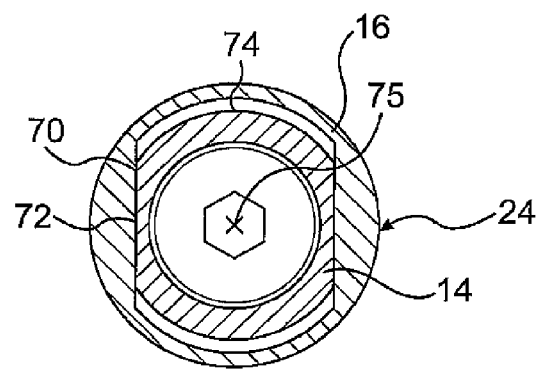
FIG. 4 is a cross-sectional view taken along line 4-4 of the suspension system of FIG. 2.
Figure 5:
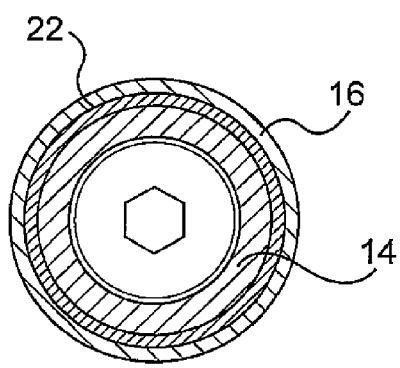
FIG. 5 is a cross-sectional view taken along line 5-5 of the suspension system of FIG. 2.

Looking to FIG. 2, the shock-absorbing mechanism 18 includes positive and negative springs 38, 40. The positive spring 38 biases the inner and outer tubes 14, 16 away from each other while the negative spring 40 counteracts the force of the positive spring 38 by biasing the inner and outer tubes 14, 16 toward each other and also resists top-out impacts. The positive and negative springs 38, 40 are disposed in the inner tube 14. The suspension system 12 also includes a rod 42. The rod 42 extends through an end 44 of the inner tube 14 and is secured to the outer tube 16 by threading an end 46 of the rod 42 into a plug 48 that is welded to the outer tube 16. The other end 50 of the rod 42 includes a head 52 having first and second surfaces 54, 56. One end 58 of the positive spring 38 is located adjacent the second surface 56 of the head 52 of the rod 42 and the other end 60 of the positive spring 38 is supported by a first retaining element, in this embodiment, a retaining ring 62. The negative spring 40 is located between a second retaining element, in this embodiment, the end 44 of the inner tube 14 and the first surface 54 of the head 52 of the rod 42. When the fork 10 is loaded, the fork legs 26, 28 and the inner tube 14 slide toward an end 64 of the outer tube 16, compressing the positive spring 38 between the rod 42 and the retaining ring 62. When the fork 10 rebounds, the negative spring 40 cushions the top-out impact when the inner tube 14 returns to its initial position. Preferably, the positive and negatives springs 38, 40 are disposed entirely in the inner tube 14, minimizing the steerer tube length SL. The steerer tube length SL is measured from one end of the outer tube to the other end of the outer tube (see FIG. 2).

An end 66 of the inner tube 14 may be connected to the fork legs 26, 28 by welding, press fit, adhesive bonding or the like. A portion of the inner tube 14 has a circular outer surface 68 (see FIG. 5) and another portion of the inner tube 14 preferably has a non-circular outer surface 70, in this embodiment, a double-D shaped outer surface (see FIGS. 3 and 4). More preferably, the outer surface 70 of the inner tube 14 has two flat sections and two curved sections. The first and second bushings 20, 22 are disposed between the inner and outer tubes 14, 16 to facilitate the axial sliding movement of the inner tube 14 in response to suspension loading. The first and second bushings 20, 22 are circular and pressed onto the outer tube 16.

The steering control mechanism 24 is located between the first and second bushings 20, 22. The steering control mechanism 24 includes the non-circular outer surface 70 of the inner tube 14 mating with a complimentary-shaped non-circular inner surface 72 of the outer tube 16. The mating of the non-circular surfaces 70, 72 of the inner and outer tubes 14, 16 prevents relative rotation between the inner and outer tubes 14, 16 while permitting axial sliding movement of the inner tube 14. The steering control mechanism 24 may also include a clearance 74 between the inner and outer tubes 14, 16 at the curved sections of the outer surface 70 to permit lateral motion between the inner and outer tubes in a direction transverse to an outer tube axis 75.

Typically, suspension forks absorb axial loads with the springs, while the bushings support the fork in response to fore-and-aft loads. Suspension forks may experience large fore/aft loading. In other devices, the spacing between the bushings has not been sufficient to handle these lateral loads, resulting in the fork binding. The distance between the bushings is referred to as the bushing length BL and is measured from a bottom of the second or lower bushing 22 to a top of the first or upper bushing 20. The farther apart the bushings, the lower the lateral loading, resulting in a smoother operating fork. Therefore, it is desirable to maximize the distance between the bushings. In the present invention, by locating the steering control mechanism 24 between the first and second bushing 20, 22, the bushing length BL is maximized relative to the inner diameter of the inner tube 14. Typically, the ratio of the bushing length BL to the inner tube diameter in other devices is about 1.6. In contrast, the present invention has a bushing length BL to the inner tube diameter ratio that is greater than 4 or preferably approximately 5.8. This ratio allows the fork to handle most lateral loading.

Figure 6:
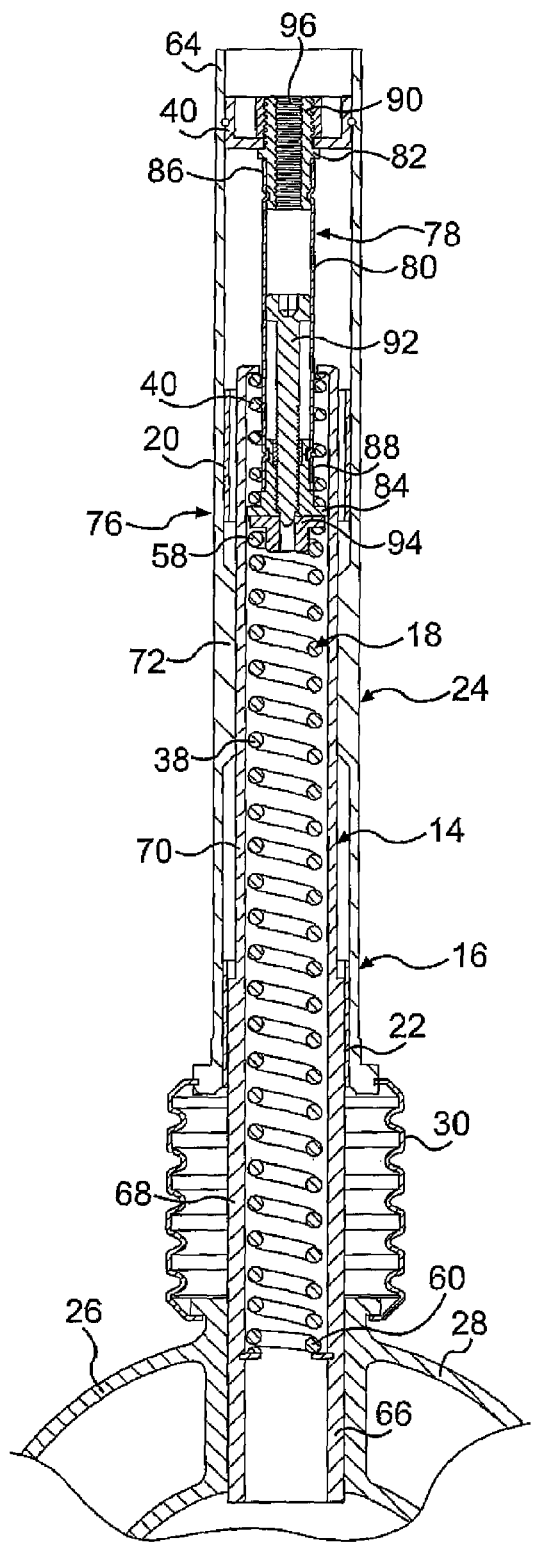
FIGS. 6 and 7 are cross-sectional views of a suspension system having a preload adjuster in accordance with another embodiment of the present invention illustrating the preload adjuster at different positions.
Figure 7:
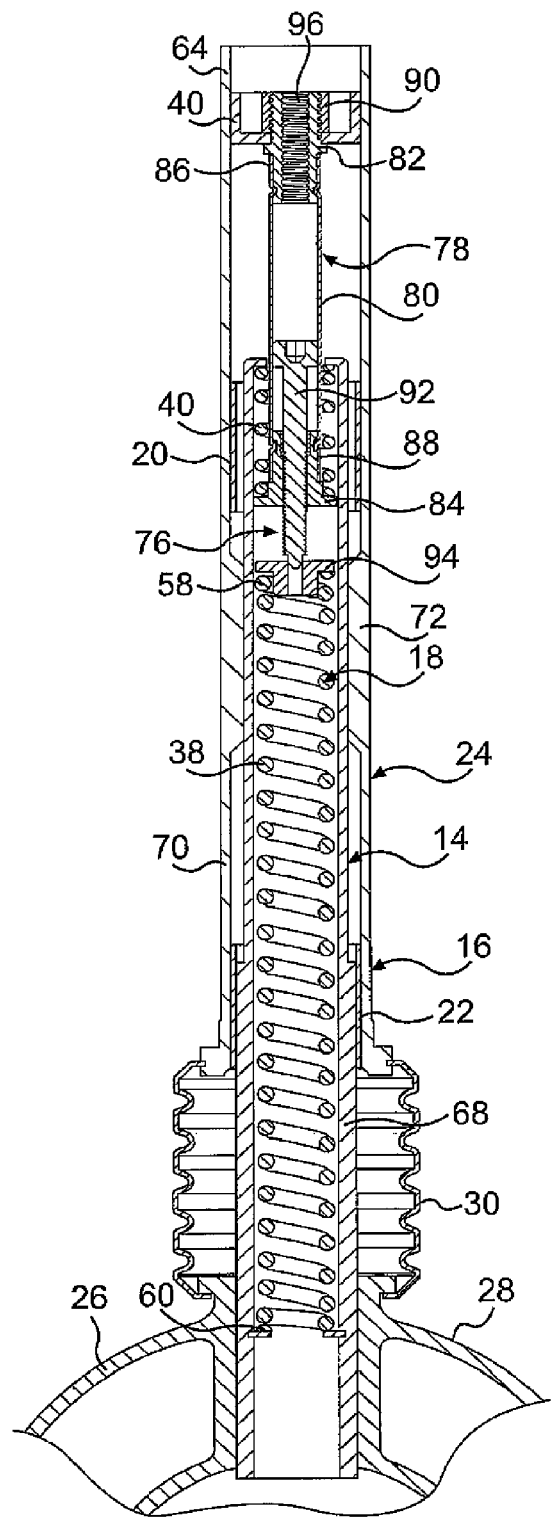

Looking to FIGS. 6 and 7, another embodiment of the present invention is shown, similar to the embodiment of FIGS. 1-5, except that it includes a preload adjuster 76 and the rod 42 has been replaced with a tube assembly 78 including a tube 80 and first and second inserts 82, 84. The preload adjuster 76 adjusts the preload of the positive spring 38. The first and second inserts 82, 84 are attached to first and second ends 86, 88, respectively, of the tube 80 by a roll crimping process, The first insert 82 is secured to the plug 48 with a threaded nut 90. The preload adjuster 76 includes an adjustment element 92, in this embodiment a bolt, and a preload element 94, in this embodiment a preload plate. The bolt 92 is located inside the tube 80 and is threaded into the second insert 84 of the tube assembly 78. The preload plate 94 is located at the end 58 of the positive spring 38 such that when the bolt 92 is rotated toward the end 66 of the inner tube 14, the preload plate 94 pushes against the positive spring 38, compressing the positive spring 38. The first insert 82 may have an internal thread 96 for accepting a headset preload bolt (not shown). This eliminates the need for a star-nut that is usually required by most headsets.

While this invention has been described in reference to certain embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A bicycle fork suspension system comprising:
   an outer tube;
   an inner tube slidable within the outer tube;
   first and second friction-reducing elements disposed between the inner and outer tubes, at least one of the friction-reducing elements being non-displaceably attached in position;
   a steering control mechanism to prevent relative rotation between the inner and outer tubes, the steering control mechanism disposed below the first and above the second of the friction-reducing elements, the steering control mechanism including a non-circular outer surface of the inner tube mating with a complimentary-shaped non-circular inner surface of the outer tube; and
   a shock-absorbing mechanism.

2. The suspension system of claim 1, wherein the steering control mechanism is configured to permit relative motion between the inner and outer tubes in a direction transverse to an outer tube axis.

3. The suspension system of claim 1, wherein the first and second friction-reducing elements are circular bushings and substantially do not transfer torque between the inner and outer tubes.

4. The suspension system of claim 1, further comprising a rod connected to the outer tube and extending into the inner tube.

5. The suspension system of claim 4, wherein the shock-absorbing mechanism includes a spring disposed in the inner tube, the spring biasing the inner and outer tubes away from each other, the spring disposed between an end of the rod and a retaining element of the inner tube.

6. The suspension system of claim 1, wherein the shock-absorbing mechanism includes a positive spring for biasing the inner and outer tubes away from each other and a negative spring for biasing the inner and outer tube toward each other.

7. The suspension system of claim 6, wherein the positive and negative springs are disposed in the inner tube.

8. The suspension system of claim of 7, wherein the positive and negative spring are disposed entirely in the inner tube.

9. The suspension system of claim 7, further comprising a rod connected to the outer tube and extending into the inner tube, the rod including a head having first and second surfaces, the positive spring disposed between the first surface of the head of the rod and a first retaining element of the inner tube and the negative spring disposed between the second surface of the head of the rod and a second retaining element of the inner tube.

10. The suspension system of claim 1, wherein the first and second friction-reducing elements are positioned within the suspension system such that a ratio of a friction-reducing element length to a diameter of the inner tube is greater than 4.

11. The suspension system of claim 10, wherein the ratio of the friction-reducing element length to the diameter of the inner tube is approximately 5.8.

12. The suspension system of claim 1, further comprising a preload adjuster for adjusting the preload of the shock-absorbing mechanism.

13. A bicycle fork suspension system comprising:
an outer tube;
an inner tube slidable within the outer tube;
first and second friction-reducing elements disposed between the inner and outer tubes, at least one of the friction-reducing elements being non-displaceably attached in position;
a steering control mechanism to prevent relative rotation between the inner and outer tubes, the steering control mechanism disposed below the first and above the second of the friction-reducing elements;
a rod connected to the outer tube and extending into the inner tube; and
a shock-absorbing mechanism disposed in the inner tube, the shock-absorbing mechanism disposed between an end of the rod and a retaining element of the inner tube.

14. The suspension system of claim 13, wherein the steering control mechanism includes a non-circular outer surface of the inner tube matingly engaged with a complimentary-shaped non-circular inner surface of the outer tube.

15. The suspension system of claim 13, wherein the steering control mechanism is configured to permit relative motion between the inner and outer tubes in a direction transverse to an outer tube axis.

16. The suspension system of claim 13, wherein the first and second friction-reducing elements are circular bushings and substantially do not transfer torque.

17. The suspension system of claim 13, wherein the shock-absorbing mechanism includes a positive spring for biasing the inner and outer tubes away from each other and a negative spring for biasing the inner and outer tube toward each other.

18. The suspension system of claim 17, wherein the positive and negative springs are disposed in the inner tube.

19. The suspension system of claim 18, wherein the positive and negative springs are disposed entirely in the inner tube.

20. The suspension system of claim 13, wherein the first and second friction-reducing elements are positioned within the suspension system such that a ratio of a friction-reducing element length to a diameter of the inner tube is greater than 4.

21. The suspension system of claim 20 wherein the ratio of the friction-reducing element length to the diameter of the approximately 5.8.

22. The suspension system of claim 13, further comprising a preload adjuster for adjusting the preload of the shock-absorbing mechanism.

23. A bicycle steerer tube suspension system comprising:
an outer tube;
an inner tube slidable within the outer tube;
a friction-reducing element disposed between the inner and outer tubes and non-displaceably attached in position, the friction-reducing element positioned within the suspension system such that a ratio of a friction-reducing element length to a diameter of the inner tube is greater than 4;
a steering control mechanism to prevent relative rotation between the inner and outer tubes, the steering control mechanism including a non-circular outer surface of the inner tube mating with a complimentary-shaped non-circular inner surface of the outer tube; and
a shock-absorbing mechanism.

24. The suspension system of claim 23, wherein the friction-reducing element is a circular bushing and substantially does not transfer torque between the inner and outer tubes.

25. The suspension system of claim 23, further comprising a rod connected to the outer tube and extending into the inner tube.

26. The suspension system of claim 25, wherein the shock-absorbing is disposed between an end of the rod and a retaining element of the inner tube.

27. The suspension system of claim 23, wherein the shock-absorbing mechanism includes a positive spring for biasing the inner and outer tubes away from each other and a negative spring for biasing the inner and outer tube toward each other.

28. The suspension system of claim 27, wherein the positive and negative springs are disposed in the inner tube.

29. The suspension system of claim 28, wherein the positive and negative springs are disposed entirely in the inner tube.

30. The suspension system of claim 28, wherein the rod includes a head having first and second surfaces, the positive spring disposed between the first surface of the head of the rod and a first retaining element of the inner tube and the negative spring disposed between the second surface of the head of the rod and a second retaining element of the inner tube.

31. The suspension system of claim 23, wherein the ratio of the friction-reducing element length to the diameter of the inner tube is approximately 5.8.

32. The suspension system of claim 23, further comprising a preload adjuster for adjusting the preload of the shock-absorbing mechanism.

33. A bicycle steerer tube suspension system comprising:
an outer tube;
an inner tube slidable within the outer tube;
a rod connected to the outer tube and extending into the inner tube;
a friction-reducing element disposed between the inner and outer tubes and non-displaceably attached in position, the friction-reducing element positioned within the suspension system such that a ratio of a friction-reducing element length to a diameter of the inner tube is greater than 4;

a steering control mechanism to prevent relative rotation between the inner and outer tubes, the steering control mechanism including a non-circular outer surface of the inner tube mating with a complimentary-shaped non-circular inner surface of the outer tube; and a shock-absorbing mechanism.

34. The suspension system of claim 33, wherein the steering control mechanism is configured to permit relative motion between the inner and outer tubes in a direction transverse to an outer tube axis.

35. The suspension system of claim 33, wherein the friction-reducing element is a circular bushing and substantially does not transfer torque between the inner and outer tubes.

36. The suspension system of claim 33, wherein the shock-absorbing mechanism includes a spring disposed in the inner tube, the spring biasing the inner and outer tubes away from each other, the spring disposed between an end of the rod and a retaining element of the inner tube.

37. The suspension system of claim 33, wherein the shock-absorbing mechanism includes a positive spring for biasing the inner and outer tubes away from each other and a negative spring for biasing the inner and outer tube toward each other.

38. The suspension system of claim 37, wherein the positive and negative springs are disposed in the inner tube.

39. The suspension system of claim 38, wherein the positive and negative springs are disposed entirely in the inner tube.

40. The suspension system of claim 38, wherein the rod includes a head having first and second surfaces, the positive spring disposed between the first surface of the head of the rod and a first retaining element of the inner tube and the negative spring disposed between the second surface of the head of the rod and a second retaining element of the inner tube.

41. The suspension system of claim 33, wherein the ratio of the friction-reducing element length to the diameter of the inner tube is approximately 5.8.

42. The suspension system of claim 33, further comprising a preload adjuster for adjusting the preload of the shock-absorbing mechanism.

43. The suspension system of claim 27, wherein the steering control mechanism is configured to permit relative motion between the inner and outer tubes in a direction transverse to an outer tube axis.

* * * * *